US012057280B2

(12) United States Patent
Weinkopf et al.

(10) Patent No.: US 12,057,280 B2
(45) Date of Patent: Aug. 6, 2024

(54) PYROTECHNIC CIRCUIT BREAKER

(71) Applicant: ASTOTEC AUTOMOTIVE GMBH, Hirtenberg (AT)

(72) Inventors: Horst Weinkopf, Moedling (AT); Engelbert Hetzmannseder, Klosterneuburg (AT)

(73) Assignee: ASTOTEC AUTOMOTIVE GMBH, Hirtenberg (AT)

( * ) Notice: Subject to any disclaimer, the term of this patent is extended or adjusted under 35 U.S.C. 154(b) by 0 days.

(21) Appl. No.: 17/779,922

(22) PCT Filed: Apr. 22, 2021

(86) PCT No.: PCT/AT2021/060132
§ 371 (c)(1),
(2) Date: May 25, 2022

(87) PCT Pub. No.: WO2022/011401
PCT Pub. Date: Jan. 20, 2022

(65) Prior Publication Data

US 2023/0343532 A1 Oct. 26, 2023

(30) Foreign Application Priority Data

Jul. 15, 2020 (AT) .............................. A 50613/2020

(51) Int. Cl.
*H01H 9/30* (2006.01)
*H01H 39/00* (2006.01)

(52) U.S. Cl.
CPC ............ *H01H 39/006* (2013.01); *H01H 9/30* (2013.01)

(58) Field of Classification Search
CPC .... H01H 39/006; H01H 39/00; H01H 39/002; H01H 2039/008; H01H 9/30
(Continued)

(56) References Cited

U.S. PATENT DOCUMENTS 5,783,987 A * 7/1998 Kern ...................... H01H 39/00 337/403
7,123,124 B2 * 10/2006 Caruso ................. H01H 39/006 200/61.08
(Continued)

FOREIGN PATENT DOCUMENTS

AT 517872 A 5/2017
DE 102005029076 A 1/2007
(Continued)

*Primary Examiner* — William A Bolton
(74) *Attorney, Agent, or Firm* — Andrew Wilford

(57) ABSTRACT

A pyrotechnic current breaker with passive and active triggering for severing a busbar through which electric current flows has a housing through which passes the busbar that is formed with at least one break point and an adjacent fuse part. A separating punch is shiftable in the housing past the busbar to cut same. There is also a first igniter for passive triggering and moving the punch past the busbar and a second igniter for active triggering and moving the punch past the busbar. Both of the igniters act on the separating punch such that, when triggered, the separating punch cuts the busbar at the break point. The first igniter has two conductors connected to two sides of the fuse part and the second igniter has contacts connectable to an external trigger. One of the igniters is in the separating punch.

19 Claims, 3 Drawing Sheets

(58) Field of Classification Search
USPC ............................ 200/293, 522; 218/95, 111
See application file for complete search history.

(56) References Cited

U.S. PATENT DOCUMENTS

| | | | | |
|---|---|---|---|---|
| 10,012,245 | B2 * | 7/2018 | Nadeau | F42B 3/26 |
| 10,068,732 | B2 | 9/2018 | Gaudinat | |
| 10,418,212 | B2 * | 9/2019 | Warenits | H01H 9/32 |
| 10,424,448 | B2 | 9/2019 | Goldman | |
| 10,431,406 | B2 | 10/2019 | Gaudinat | |
| 10,468,216 | B2 * | 11/2019 | Marlin | H01H 39/006 |
| 10,685,799 | B2 * | 6/2020 | Sakai | H01H 39/006 |
| 2003/0230177 | A1 * | 12/2003 | Hamilton | H01H 39/006<br>439/879 |
| 2012/0234162 | A1 * | 9/2012 | Tirmizi | F42B 3/006<br>89/1.14 |
| 2013/0056344 | A1 * | 3/2013 | Borg | H01H 39/00<br>200/81 R |
| 2019/0108957 | A1 * | 4/2019 | Volkmann | H01H 39/006 |
| 2020/0279711 | A1 | 9/2020 | Mathieu | |

FOREIGN PATENT DOCUMENTS

| | | | |
|---|---|---|---|
| DE | 102017011471 | A | 1/2019 |
| FR | 3063570 | A | 9/2018 |
| FR | 3088592 | A | 5/2020 |
| WO | 2020099474 | A | 5/2020 |

* cited by examiner

PYROTECHNIC CIRCUIT BREAKER

CROSS REFERENCE TO RELATED APPLICATIONS

This application is the US-national stage of PCT application PCT/AT2021/060132 filed 22 Apr. 2021 and claiming the priority of Austrian patent application A50613/2020 itself filed 15 Jul. 2020.

FIELD OF THE INVENTION

The present invention relates to a pyrotechnic current breaker with passive and active triggering for severing a busbar that has a first igniter for the passive triggering and a second igniter for the active triggering, both of which act on a separating piston which, when triggered, separates the busbar at at least one separating point, wherein the first igniter is connected via two conductors to the two sides of a fuse ?through which current flows through the busbar, and wherein the second igniter has contacts for the connection of an external trigger.

STATE OF THE ART

Current breakers, strictly speaking pyrotechnic devices for interrupting current and voltage for the case of an accident, are now widely used in electric vehicles. Examples of this are the PSS 4 of Autoliv, described in the EP 3301701 B (U.S. Pat. No. 10,431,406), or the CB500 of Hirtenberger, described in AT 517872 B.

However, these current breakers have no intelligence, i.e. they require external circuitry for detecting abnormal operating states that in turn depends on the application of a supply voltage; they cannot completely replace a fuse.

In a further development of this idea, the pyrotechnic disconnecting device was combined with a series-connected fuse part (see US 2018277325 (U.S. Pat. No. 10,529,521) of Mersen). If the fuse part burns, a voltage difference arises at it, which voltage difference is used to trigger the pyroswitch. The fuse part alone cannot withstand the voltage. Without a pyroswitch, an arc would burn for a long time, therefore the series circuit with the pyroswitch.

Thus, passive triggering has been simulated, but there are further situations in which the connection to the vehicle battery is to be interrupted even without overcurrent. For this purpose, Mersen in FR 3063570 provides circuitry that, however, does not provide galvanic isolation of the high voltage side and the ignition circuit of the vehicle. This is not consistent with various safety regulations.

Therefore, according to WO 2019/097152 (US 2020/0279711) two igniters are provided. This design meets the requirements of the active triggering, i.e. commanded via an ignition signal, and of the automatic passive triggering triggered by overcurrent, but is complex with regard to space requirements and production costs due to the two 11 mm interfaces, in particular because no separate interface is needed for passive triggering, and does not represent an optimum solution by the eccentric arrangement of the igniters. Furthermore, a possible arc in the igniter of the passive triggering branch is not suppressed.

OBJECT OF THE INVENTION

It is an object of the present invention to eliminate these disadvantages.

SUMMARY OF THE INVENTION

This object is achieved according to the invention by a pyrotechnic current breaker of the type mentioned above in that one of the two igniters is in the separating punch, preferably the first igniter that is responsible for passive triggering.

The basic idea of the invention is the arrangement of one of the two igniters in the separating punch. This arrangement is unusual but offers various surprising advantages.

First, no eccentric arrangement is necessary for the two igniters, and nevertheless the two igniters can be galvanically isolated. Furthermore, if the igniter is accommodated in the separating punch for passive triggering, it can easily contact it internally, so that no additional interface is necessary for its electrical connection.

The electrical insulation of the two igniters is preferably effected by a drive piston that is between the separating punch and the other igniter (normally the second igniter is for active triggering). In the case of active triggering, the pressure of the second igniter is transferred to the drive piston that in turn transfers the pressure to the separating punch that then subsequently cuts through the busbar. In the case of passive triggering, the pressure acts directly on the separating punch, and the drive piston in this case acts as a boundary for the pressure chamber and does not move itself.

It is advantageous if the current breaker contains an extinguishing agent that is preferably at least partially a silicon compound, for example silicone oil or silicone grease. In this way, a stationary arc is extinguished more quickly. The extinguishing agent can be in a groove on an outside surface of the separating punch, in a groove on an outer surface of the drive piston and/or sandwiched between the drive piston and the separating punch.

In principle, it is sufficient if the busbar has only one break point, as shown in FIG. 1 of above-cited WO 2019/097152.

According to a particular embodiment of the invention, the fuse part is formed in one piece with the busbar. In this case, the safety element is an integral component of the busbar.

Whether one or two break points are provided, this can be realized in that the fuse part is formed by the break point(s). The mechanical break points are usually designed as notches or openings in the busbar, so that the separating punch can penetrate the busbar more easily. If this mechanical weakening is now even stronger than usual, a sufficiently high electrical resistance is produced there that leads to a strong heating in the event of overcurrent and with a sufficiently high excess current for fusing, exactly like a fuse part; then, at the latest, a sufficiently high voltage is produced on both sides of the break point (a), leading to ignition of the first igniter.

In the case of a busbar with two break points, the one-piece design of the fuse part and the busbar can also be realized in that the fuse part is formed by a weakened central region between these two break points and the conductors are connected to the busbar between the break points on both sides of the fuse part. In the case of the embodiment with two break points, the region between the break points (often referred to as "plate") is punched out; if the conductors are now connected to the plate (that is to say between the break points) with the busbar, then the conductors are automatically separated from the remaining (interrupted) busbar—as soon as the plate has been punched out—so that a current flow or electric arc is prevented with certainty via the first igniter.

In order to avoid further voltage losses, the busbar should have a substantially identical cross-section outside the break point(s).

In particular, if the first igniter "bypasses" the break points, i.e. is connected to the busbar by the two conductors mentioned above on both sides of the break points, there is the risk that it becomes the conductor even by arcing and thus the electrical separation does not take place sufficiently quickly or at all. In order to prevent this, it can be provided that at least one conductor has a cross section of at most 0.1 $mm^2$. With such a small cross-section, the conductor fuses when an arc is formed.

Alternatively or additionally, it can be provided that, when triggered, at least one conductor is mechanically interrupted. For this purpose, there are several possibilities: the at least one conductor can be in the movement path of the separating punch, where it is then preferably designed as a loop, but the at least one conductor can extend through the separating punch or through the drive piston or through the extinguishing agent sandwiched between the drive piston and the separating punch. If the conductor is in the movement path of the separating punch or extends through the separating punch, it is interrupted, regardless of which igniter triggers; otherwise, it is only reliably interrupted if the igniter (usually provided for active triggering) is not in the separating punch.

BRIEF DESCRIPTION OF THE DRAWINGS

The present invention will be explained in more detail with reference to the accompanying drawings, in which.

SPECIFIC DESCRIPTION OF THE INVENTION

Figure 1:
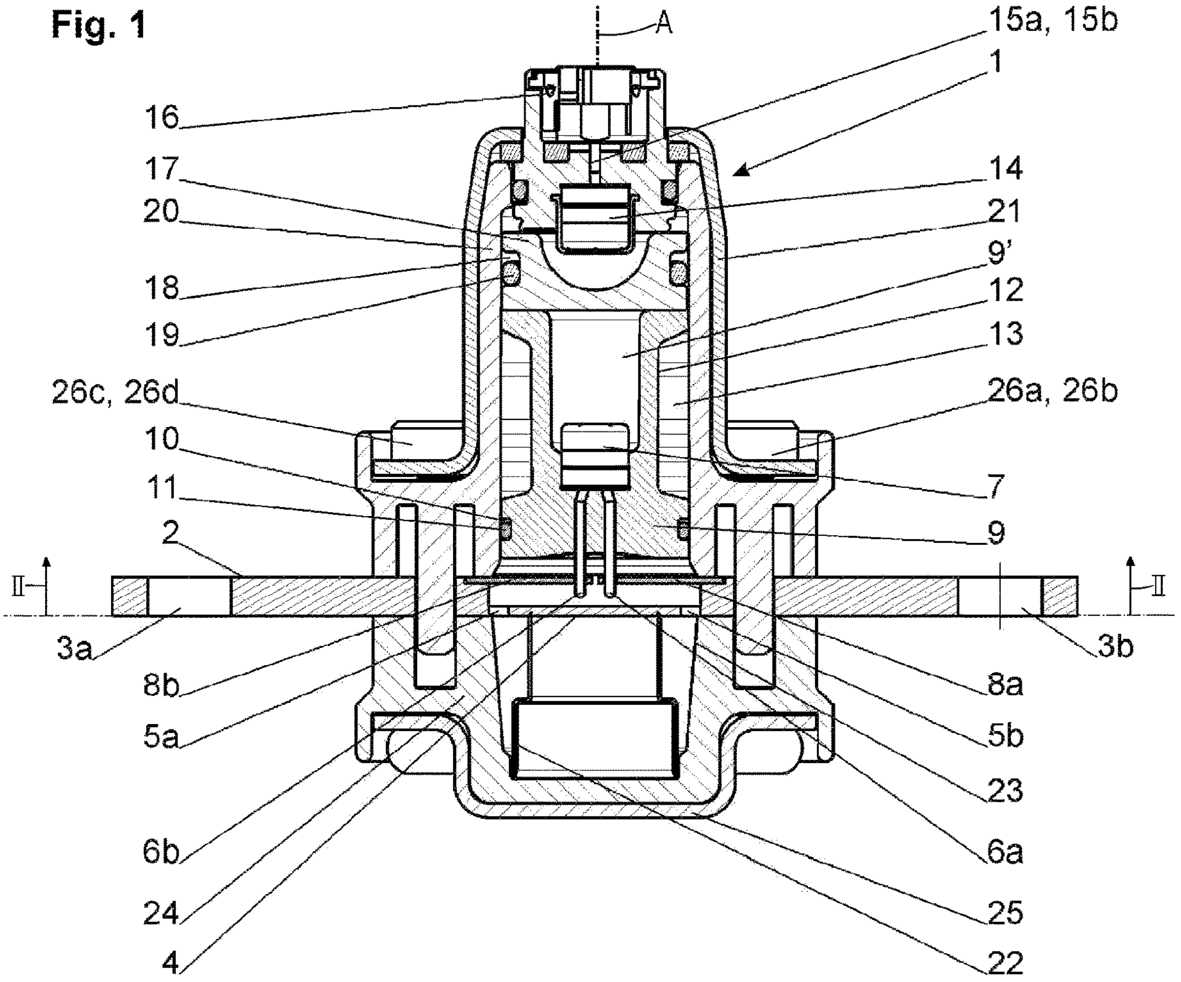
FIG. 1 is a longitudinal section through a current breaker according to the invention in an upper starting position.

A current breaker 1 according to the invention has an upper housing part 20 and a lower housing part 24 between which extends a busbar 2 with bores 3*a* and 3*b* and a weakened region 4 delimited by two rows of openings forming two break points 5*a* and 5*b*. Contact pins 6*a* and 6*b* of a first igniter 7 are connected to conductors 8*a* and 8*b*, so that the igniter is electrically connected in parallel with the weakened region 4. The igniter 7 is in a separating punch 9 carrying an 0-ring 11 in a groove 10 and an extinguishing agent 13 in a further groove 12. Furthermore, the separating punch 9 has an upwardly open central bore 9', so that the pressure created by the igniter 7 can be used to move the separating punch 9 toward the busbar 2.

The current breaker 1 has a second igniter 14 with contacts 15*a* and 15*b* accessible from the outside and held in a so-called 11 mm interface 16 by a retainer. The 11 mm interface 16 and retainer securely contact the second igniter 14 from the outside.

A drive piston 17 with a groove 18 holding an O-ring 19 is provided below the second igniter 14 toward the weakened region 4. The igniter 14, the drive piston 17 and the separating punch 9 are in the upper housing part 20 that is reinforced on the outside with a metallic reinforcement casing 21.

A brake element 22 is provided below the weakened region 4 in a bore 23 of the lower housing part 24. Like the upper housing part 20, the lower housing part 24 also has a metallic reinforcement casing 25. The upper housing part 20 and the lower housing part 24 are held together by the reinforcements 21 and 25 and four screws 26*a*-26*d*.

Figure 2:
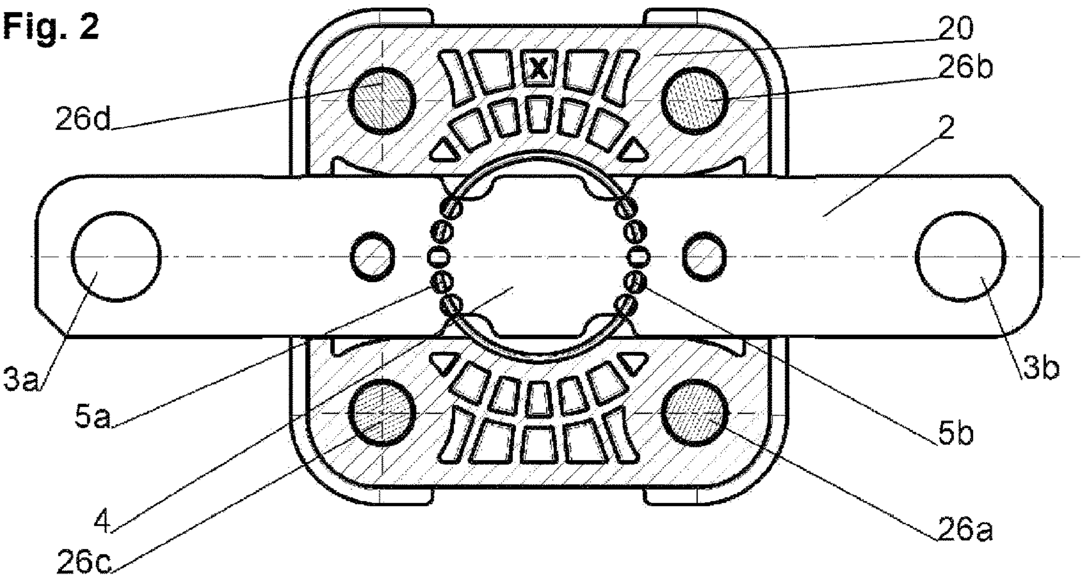
FIG. 2 is a section according to line II of FIG. 1.
Figure 3:
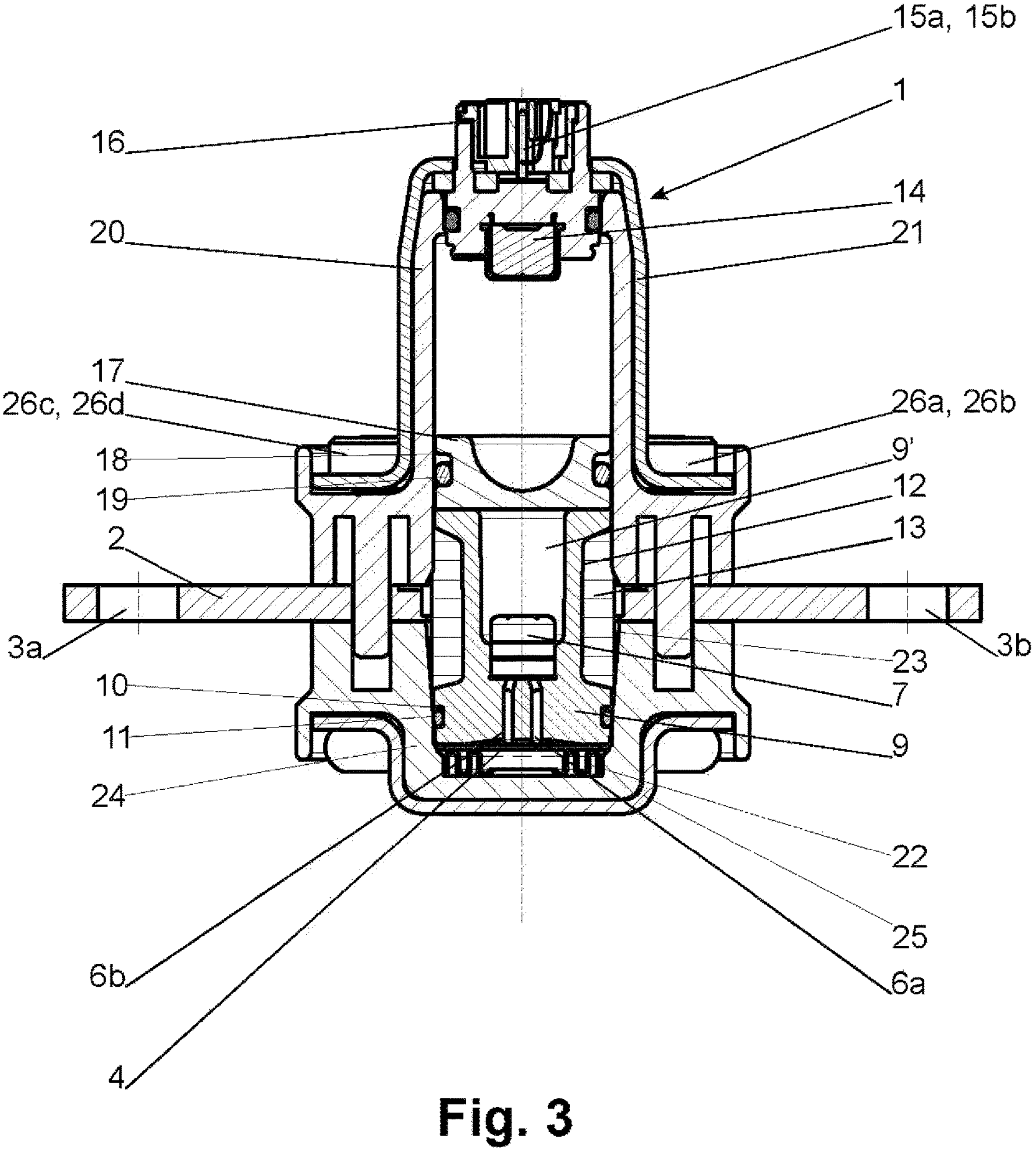
FIG. 3 shows the breaker as in FIG. 1 in an intermediate position.

FIG. 2 shows the upper housing part 20 with busbar 2 and the holes that form both a melting region in the case of overcurrent and the mechanical break points 5*a* and 5*b*.

The illustrated current breaker has the following functionalities:

a) Active Triggering

Figure 4:
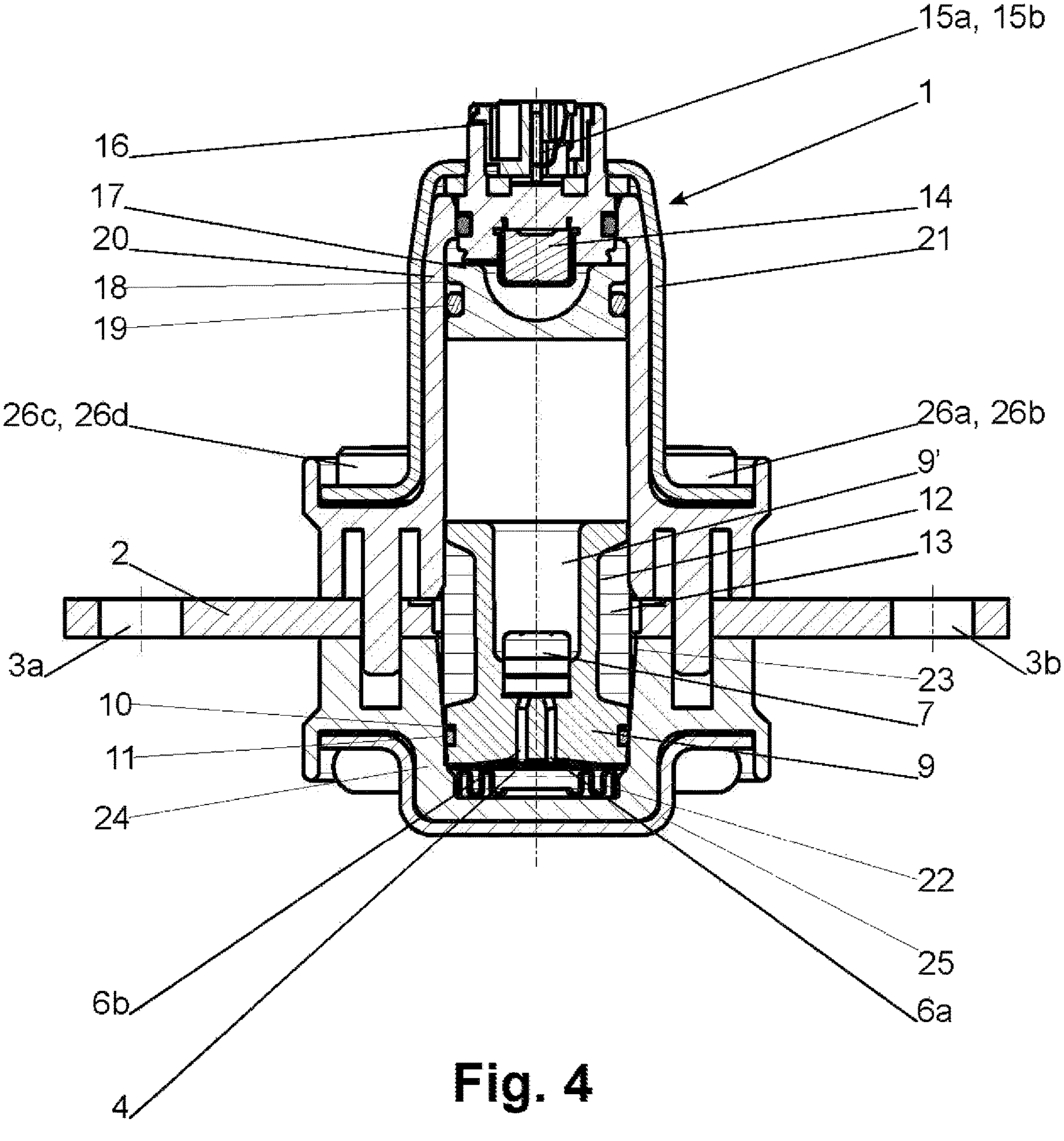
FIG. 4 shows the breaker as in FIG. 1 but in a lower end position.

When an ignition pulse is applied to the contacts (pins) 15*a* and 15*b* of the second igniter 14, it is triggered and drives the drive piston 17 down into the position of FIG. 2. Force is transmitted to the separating punch 9 to first separate the conductors 8*a* and 8*b* from the first igniter 7 and then the busbar 2 at the break points 5*a* and 5*b* formed by the holes. At the interruption points of the busbar 2, depending on the applied current intensity, electric arcs can form that are cut by movement of the separating punch 9 away from the igniter 14 and finally are extinguished by contact with the extinguishing agent 13. During movement of the separating punch 9, the brake element 22 is compressed so it can insulate the weakened region of the busbar 2 in order to avoid current flow through the brake element. In the case of this so-called "commanded triggering," first the connection to the first igniter 7 is interrupted and only subsequently is the busbar 2 cut. As a result, flow of the current to the circuit of the first igniter 7 is reliably prevented.

b) Passive Triggering:

When current flows through the busbar 2, the weakened region 4 and the two break points 5*a* and 5*b* weakened by the holes are heated. If the heating becomes too large, the busbar 2 melts like a fuse part in the weakened region. Current then is fed into the first igniter 7 and fires it, creating upward pressure in the bore 9' toward the drive piston 17. The resulting pressure is confined in a chamber formed by the drive piston 17, the separating punch 9 and the inner wall of the upper housing part 20, and drives the separating punch 9 to first separate the conductors 8*a* and 8*b* that connect the contact pins 6*a* and 6*b* of the first igniter 7 to the busbar 2 to both sides of the weakened region 4, as a result of which it is irrelevant whether or not the igniter has a certain conductivity after the triggering. Subsequently as shown in FIG. 4, the separating punch 9 moves farther down (away from the second igniter 14) and pushes the residues of the weakened region 4 of the busbar 2 downward. The weak arc that is at best produced is extinguished by contact with the extinguishing agent 13 in a manner analogous to the commanded triggering.

In principle, two variants are possible for passive triggering. The separation point/separation points in the busbar 2 can coincide with the so-called "active site", i.e. the region which melts and burns analogously to a fuse, as illustrated in FIG. 2, or spaced apart therefrom.

The embodiment in FIG. 1 has two separating points 5*a*, 5*b* that are separated during the commanded triggering. However, the principle can be adapted for systems with only one separation point. Clearly, the tapping of the voltage for the passive triggering takes place at the two sides of the "active site" for the passive triggering that can coincide with the mechanical separation point, but does not have to be. For the separation of the conductors 8*a*, 8*b* for the passive triggering, this means that this separation can also be effected by guiding the conductors 8*a*, 8*b* through one of the pistons or through the intermediate space between the two pistons in order to prevent a current path through the first igniter 7 during the commanded triggering.

Common to all concepts is that the separation of the conductors 8_a_, 8_b_ for the passive triggering with commanded triggering can also be realized in a particularly advantageous manner by separating a loop through the separating piston 9.

The invention claimed is:

1. A pyrotechnic current breaker with passive and active triggering for severing a busbar through which electric current flows, the breaker comprising:
- a housing through which passes the busbar that is formed with at least one break point and an adjacent fuse part;
- a separating punch shiftable in the housing past the busbar to cut same;
- a first igniter for passive triggering and moving the punch past the busbar; and
- a second igniter for active triggering and moving the punch past the busbar, both of the igniters acting on the separating punch such that, when triggered, the separating punch cuts the busbar at the break point, the first igniter having two conductors connected to two sides of the fuse part and the second igniter having contacts connectable to an external trigger, one of the igniters being in the separating punch.

2. The current breaker according to claim 1, wherein the first igniter is in the separating punch.

3. The current breaker according to claim 1, wherein for electrically insulating the two igniters, the current breaker comprises:
- a drive piston between the separating punch and the second igniter.

4. The current breaker according to claim 3, further comprising:
- an extinguishing agent.

5. The current breaker according to claim 4, wherein the extinguishing agent is in a groove on an outer surface of the separating punch.

6. The current breaker according to claim 4, wherein the extinguishing agent is in a groove on an outer surface of the drive piston.

7. The current breaker according to claim 4, wherein the extinguishing agent is between the drive piston and the separating punch.

8. The current breaker according claim 7, wherein at least one conductor extends through the extinguishing agent and is cut when the circuit breaker is triggered.

9. The current breaker according to claim 4, wherein the extinguishing agent is at least partially a silicon oil or grease.

10. The current breaker according to claim 3, wherein at least one conductor extends through the drive piston and is mechanically cut when the current breaker is triggered.

11. The current breaker according to claim 1, wherein the fuse part is formed in one piece with the busbar.

12. The current breaker according to claim 11, wherein the fuse part is formed by the break points.

13. The current breaker according to claim 11, wherein the busbar has two break points, the fuse part is formed by a weakened region between the two break points, and the conductors are connected to the busbar between the break points on both sides of the fuse part.

14. The current breaker according to claim 11, wherein the busbar is of substantially uniform cross-section outside the break point.

15. The current breaker according to claim 1, wherein at least one of the conductors has a cross section of at most 0.1 $mm^2$.

16. The current breaker according to claim 1, wherein at least one of the conductors is mechanically cut when the current breaker is triggered.

17. The current breaker according to claim 16, wherein at least one conductor is in a movement path of the separating punch.

18. The current breaker according to claim 17, wherein the at least one conductor is shaped as a loop.

19. The current breaker according to claim 16, wherein at least one conductor extends through the separating punch.

* * * * *